(12) United States Patent
Yamao (10) Patent No.: US 8,745,532 B2
(45) Date of Patent: Jun. 3, 2014

(54) DISPLAY DEVICE

(75) Inventor: Takahiro Yamao, Osaka (JP)

(73) Assignee: Panasonic Corporation, Osaka (JP)

( * ) Notice: Subject to any disclaimer, the term of this patent is extended or adjusted under 35 U.S.C. 154(b) by 261 days.

(21) Appl. No.: 12/597,000

(22) PCT Filed: Jan. 29, 2009

(86) PCT No.: PCT/JP2009/000342
§ 371 (c)(1),
(2), (4) Date: Oct. 22, 2009

(87) PCT Pub. No.: WO2009/096183
PCT Pub. Date: Aug. 6, 2009

(65) Prior Publication Data
US 2010/0131897 A1    May 27, 2010

(30) Foreign Application Priority Data
Jan. 31, 2008  (JP) ................. 2008-020466

(51) Int. Cl.
*G06F 3/048*   (2013.01)
*G06F 21/30*   (2013.01)
*G06F 17/24*   (2006.01)
*G06F 17/21*   (2006.01)
*G06K 9/00*    (2006.01)

(52) U.S. Cl.
CPC .............. *G06F 21/305* (2013.01); *G06F 21/30* (2013.01); *G06F 17/243* (2013.01); *G06F 17/211* (2013.01); *G06K 9/00449* (2013.01)
USPC ........... 715/811; 715/764; 715/765; 715/766; 715/767; 715/768; 715/722; 715/769

(58) Field of Classification Search
CPC ........... H04N 21/4131; H04N 21/4227; G06F 1/3209; G06F 21/31; G06F 3/0482
USPC .................................................. 715/764–769
See application file for complete search history.

(56) References Cited

U.S. PATENT DOCUMENTS 5,396,264 A * 3/1995 Falcone et al. ................ 715/811
5,699,052 A   12/1997 Miyahara
(Continued)

FOREIGN PATENT DOCUMENTS

JP    06-233202 A    8/1994
JP    2001-344163 A  12/2001
(Continued)

OTHER PUBLICATIONS

Kolberg et al.; Using Pen and Paper to Control Networked Appliances; © 2006; IEEE; 7 pages.*

(Continued)

*Primary Examiner* — Linh K Pham
(74) *Attorney, Agent, or Firm* — McDermott Will & Emery LLP (57) ABSTRACT

The display device allows easily operating plural controlled devices connected to a network. The display device includes a communication unit communicating with controlled devices X1 through Xn connected to a network; an information acquiring unit acquiring operation-related information from controlled devices X1 through Xn through the communication unit; an information classifying unit classifying URL information into plural function groups based on operation information contained in operation-related information; a menu generating unit generating a menu page for each of the function groups; a display unit displaying the menu page generated by the menu generating unit; and a page operation unit operating the menu page.

6 Claims, 6 Drawing Sheets

(56) References Cited

U.S. PATENT DOCUMENTS

| | | | |
|---|---|---|---|
| 6,288,716 B1* | 9/2001 | Humpleman et al. | 715/733 |
| 6,580,950 B1* | 6/2003 | Johnson et al. | 700/17 |
| 7,184,024 B2* | 2/2007 | Eftekhari | 345/169 |
| 7,583,685 B2* | 9/2009 | Ajitomi et al. | 370/401 |
| 7,607,091 B2* | 10/2009 | Song | 715/734 |
| 7,786,891 B2* | 8/2010 | Owens et al. | 340/541 |
| 7,957,697 B2* | 6/2011 | Park et al. | 455/41.2 |
| 8,170,183 B2* | 5/2012 | Howard | 379/88.22 |
| 8,250,136 B2* | 8/2012 | Maekawa et al. | 709/203 |
| 2002/0180579 A1* | 12/2002 | Nagaoka et al. | 340/3.1 |
| 2004/0063405 A1* | 4/2004 | Song | 455/41.2 |
| 2005/0009498 A1* | 1/2005 | Ho et al. | 455/402 |
| 2005/0120096 A1* | 6/2005 | Rekimoto et al. | 709/220 |
| 2007/0162667 A1* | 7/2007 | Kim et al. | 710/62 |
| 2007/0168200 A1* | 7/2007 | Shimizu | 705/1 |
| 2007/0255796 A1* | 11/2007 | Lee et al. | 709/208 |
| 2007/0276691 A1* | 11/2007 | Grant | 705/1 |
| 2008/0209034 A1* | 8/2008 | Shin et al. | 709/224 |
| 2009/0066534 A1* | 3/2009 | Sivakkolundhu | 340/825.52 |
| 2009/0121842 A1* | 5/2009 | Elberbaum | 340/10.5 |
| 2009/0271470 A1* | 10/2009 | Hatanaka | 709/202 |

FOREIGN PATENT DOCUMENTS

| | | |
|---|---|---|
| JP | 2001-344163 A | 12/2001 |
| JP | 2002-140155 A | 5/2002 |
| JP | 2003-309884 A | 10/2003 |
| JP | 2003-309884 A | 10/2003 |

OTHER PUBLICATIONS

Helal et al.; The Gator Tech Smart House: A Programmable Pervasive Space; © 2005; IEEE; 11 pages.*

Eikerling et al; Design of OSGi Compatible Middleware Components for Mobile Multimedia Applications; © Springer-Verlag Berlin Heidelberg 2002; 12 pages.*

Chunduru et al.; Effects of Power Lines on Performance of Home Control System; © 2006; IEEE; 6 pages.*

International Search Report for Application No. PCT/JP2009/000342, May 12, 2009, Panasonic Corporation.

* cited by examiner

| Remote control key information | Operation command information |
|---|---|
| #1 | Low-speed forward playback |
| #2 | Normal-speed forward playback |
| #3 | High-speed forward playback |
| #4 | Stop |
| #5 | Stop |
| #6 | Stop |
| #7 | Low-speed reverse playback |
| #8 | Normal-speed reverse playback |
| #9 | High-speed reverse playback |

DISPLAY DEVICE

This Application is a U.S. National Phase Application of PCT International Application PCT/JP2009/000342.

TECHNICAL FIELD

The present invention relates to a display device network-connected to controlled devices.

BACKGROUND ART

In recent years, household electrical appliances (described as "controlled device" hereinafter) controlled through a network have been available. Accordingly, a display device has been devised for controlling plural controlled devices connected to a network.

The display device includes a communication unit sending and receiving data, connected to a network; an information acquiring unit; a display unit displaying an operation screen; and an operation unit operating the operation screen displayed on the display unit. The information acquiring unit detects a controlled device connected to the network and acquires the device ID information, product category information, and URL (uniform resource locator) information of the controlled device detected. The information acquiring unit acquires an operation screen for operating the controlled device from the URL destination specified by the URL information.

With such configuration, the display device displays a controlled device list for each product category on its display unit, and further acquires from the URL destination an operation screen for operating a controlled device selected by the user from the list, to display the operation screen on its display unit. Then, the user operates the controlled device by using the operation screen. Such a display device is disclosed in patent literature 1, for example.

When the user operates a controlled device by using such a conventional display device, the user first selects a target controlled device from the controlled device list for each product category displayed on the display device. Next, the display device displays the URL information on the controlled device selected by the user. Then, the display device acquires an operation screen provided at the URL destination specified by the user and displays the operation screen. In other words, the user can learn function details (settings for viewing and operation) only after viewing the operation screen acquired from the URL destination. Accordingly, the user searches for a target controlled device from the product category list, for example, even if he or she simply desires to view a camera image. Then, the user needs to download an operation screen from the URL destination of the controlled device to check if an image is viewable, in each case. Consequently, a conventional display device places a heavy burden in operation on the user, requires long operation time, and makes it difficult to operate a controlled device.

[Patent literature 1] Japanese Patent Unexamined Publication No. 2003-309884

SUMMARY OF THE INVENTION

The present invention provides a display device allowing plural controlled devices connected to a network to be operated easily.

The display device, network-connected to controlled devices, includes an information acquiring unit acquiring from a controlled device operation-related information including operation information and URL information corresponding to the operation information; an information classifying unit classifying the URL information into plural function groups based on the operation information; a menu generating unit generating a menu page for selecting a controlled device for each function group; a display unit displaying a menu page; and a page operation unit operating a menu page to access corresponding URL information.

REFERENCE MARKS IN THE DRAWINGS

27 Communication unit
28 Operation-related information storing unit
29 Page processing unit
30 Operation-related information
40 Basic menu page
41 Set menu
42 View menu
43 Set menu page
44 View menu page
45 Operation screen page
48 Operation screen page
49 Image display area
50 Operation-corresponding information
51 Menu
100 Device control system
200 Home
300 Network
400 First camera
500 Second camera
600 Intercom
700 Air conditioner
800 Lighting device
900 Display device
921 Communication unit
922 Information acquiring unit 923 Information classifying unit
924 Menu generating unit
925 Display unit
926 Page operation unit
9251 Layout control unit
9261 Operation history information storing unit

DETAILED DESCRIPTION OF PREFERRED EMBODIMENTS

Hereinafter, a detailed description is made of some embodiments of the present invention using the related drawings.

First Exemplary Embodiment

Figure 1:
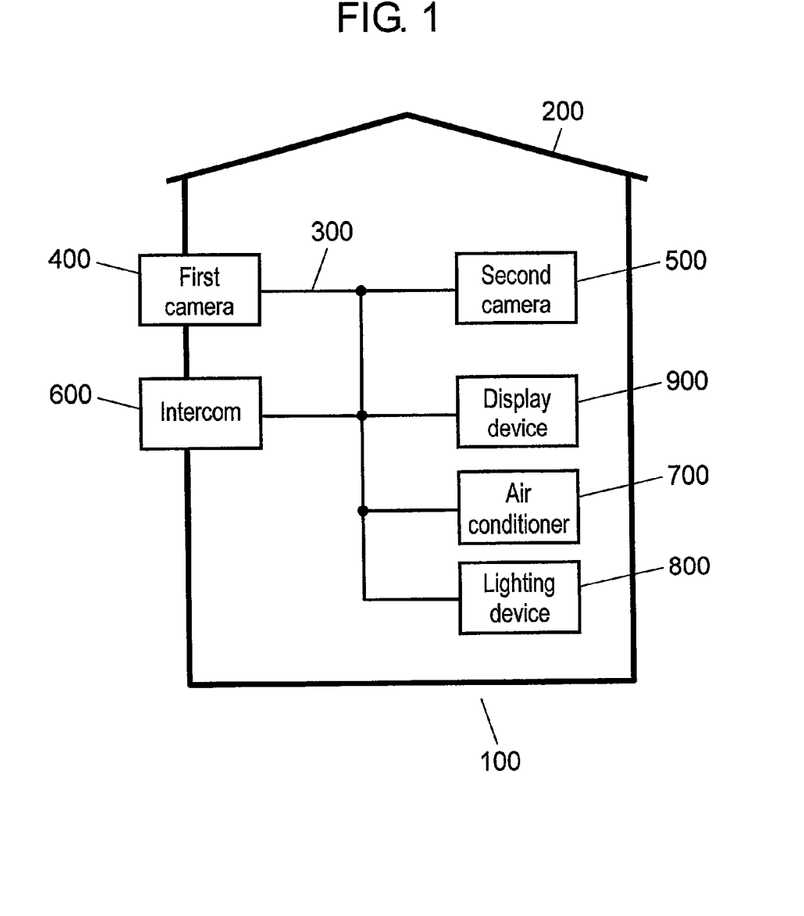
FIG. 1 is a block diagram showing the general configuration of a device control system according to the first exemplary embodiment of the present invention.
Figure 2:
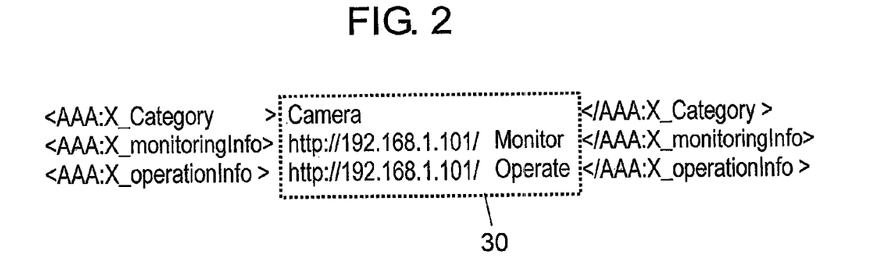
FIG. 2 shows an example of operation-related information described in the extended area of UPnP specifications, according to the embodiment.
Figure 3:
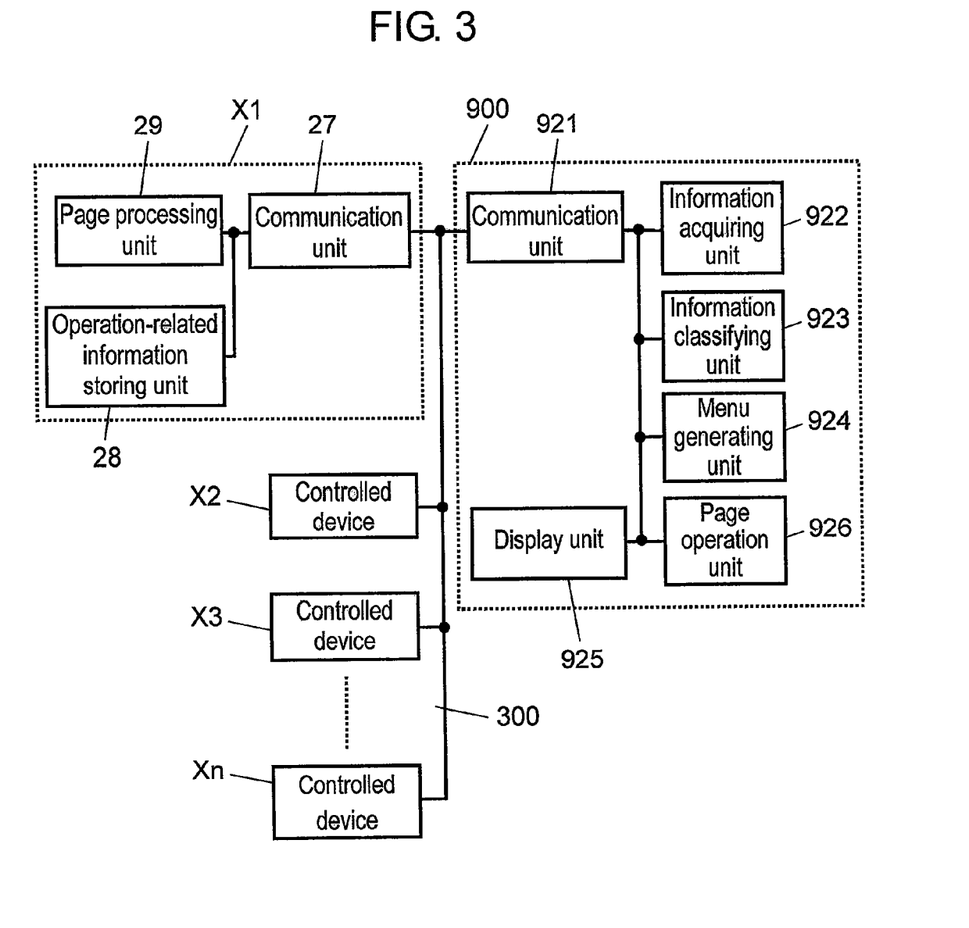
FIG. 3 is a block diagram showing configuration of a control device and controlled devices according to the embodiment.

First, a description is made of device control system 100 according to the first exemplary embodiment of the present invention referring to FIGS. 1 through 3. FIG. 1 is a block diagram showing the general configuration of device control system 100 according to the embodiment. FIG. 2 shows an example of operation-related information described in the extended area of UPnP specifications, according to the first embodiment. FIG. 3 is a block diagram showing configuration of a control device and controlled devices according to the first embodiment.

As shown in FIG. 1, device control system 100 includes controlled devices and a control device controlling these controlled devices. For example, network 300 inside home 200 has controlled devices connected thereto including first camera 400, second camera 500, intercom 600, air conditioner 700, lighting device 800, and display device 900 such as a TV receiver (described as TV, hereinafter) having the function as a control device.

Between a control device and controlled devices, messages are exchanged with the aid of the mechanism of UPnP (Universal Plug and Play), for example. At this time, the control device and controlled devices communicate via TCP/IP (Transmission Control Protocol/Internet Protocol). Meanwhile, when the control device and controlled devices are connected to network 300, they acquire an IP address first, and then multicast a command for detecting connected devices to inform each device on network 300 that they have been connected. More specifically, the control device and controlled devices inform all the devices connected to network 300 by multicasting that new devices have been connected and of their function details. After that, the control device and controlled devices inform network 300 of their own presence at regular time intervals. In this way, the control device receives a message from a controlled device and stores the message, and thus can control the controlled device according to the list stored. The control device can determine connection conditions of devices connected to network 300 at regular time intervals to update the list to the latest circumstances.

Next, to learn services of the controlled device, the control device exchanges with the controlled device messages describing (on XML base) device information and service information (e.g. which product category each device belongs to, what function each device provides). Hypertext (HTTP protocol) is used in this exchange.

In the above-described exchange, operation-related information on the controlled device is passed to the control device through the extended area of UPnP specifications. As shown in FIG. 2, operation-related information 30 on the controlled device is described in the extended area of DDD (Device Description Document), for example, which is device information of UPnP. As operation-related information 30, product category information, operation information, and URL information corresponding to the operation information are described. The control device thus can learn operation-related information such as product category information (e.g. camera), operation information representing an operation function (e.g. monitor, operate), and URL information representing the destination from which an operation screen for the operation function is acquired. Here, messages are exchanged between the control device and controlled devices according to preliminarily determined specifications.

The control device can thus perform operation setting specific to the controlled device and can use functions specific to the controlled device by using operation-related information 30 of the controlled device.

First camera 400 and second camera 500 can take an image of a subject. First camera 400 and second camera 500 can output an image taken by camera function to display device 900 through network 300.

Intercom 600, placed such as at an entrance, allows talking with a visitor. Intercom 600 further includes a camera and takes an image of a visitor with this camera. Intercom 600 thus has conversation function and camera function. Intercom 600 can output an image and sound obtained by using the conversation and camera functions to display device 900 through network 300.

Air conditioner 700 can condition temperature and humidity in a room by setting function. For example, air conditioner 700 has functions such as Cool, Heat, Dry, and Fan and is operated such as with a dedicated remote controller (described as "remote control" hereinafter). Air conditioner 700 is also operated from display device 900 through network 300.

Lighting device 800 can adjust brightness of a room by using brightness adjusting function.

With such configuration, device control system 100 can control first camera 400, second camera 500, intercom 600, air conditioner 700, and lighting device 800 from display device 900 through network 300.

More specifically, when controlled devices are connected to network 300, display device 900 acquires operation-related information such as device ID information, product category information, operation information, and URL information from each controlled device. Then, display device 900, after specifying operation information (function) contained in the operation-related information, acquires an operation screen provided at the corresponding URL destination, thereby allowing a corresponding controlled device to be operated based on the operation screen.

Meanwhile, as a unified control command for controlling a controlled device, such as definition information compliant with ECHONET (Energy Conservation and HOmecare NETwork), for example, can be used. In this way, a controlled device can be controlled without requiring preliminarily to know information on the controlled device. Here, any controlled device can be handled as long as it is compliant with known interconnect specifications (not limited to ECHONET) allowing unified controlling. Interconnect specifications may be HAVi (Home Audio/Video Interoperability), HBS (Home Bus System), or IEEE 1394 Serial Bus, for example.

When interconnect specifications prescribed by ECHONET are used, categories (group) include sensor-related device, housing-equipment-related device, health-related device, and management-and-operation-related device.

Under the above-described categories, controlled devices belonging to each category are defined. Under air-conditioning-related device, for example, devices are defined as a class such as home air conditioner, cold air fan, electric fan, ventilation fan, and air cleaner.

A controlled device compliant with ECHONET specifications is obliged to contain an identification code for the above-described category and class, so that a category code and class code can be read directly from each controlled device through network 300.

Further, a class has an attribute identifier called an EPC (ECHONET property code), where an identification code representing the property of each controlled device is allocated to the attribute identifier. Each EPC has a property value called EDT (ECHONET property value data) defined, where typically each unique EDT is defined for each EPC.

The class of home air conditioner, for example, has the EPC of operation mode, to which the EDTs of Cool, Heat, Dry, Fan, and Auto are defined.

In this way, a control device acquires identifying information and operation-related information on each controlled device, and acquires definition information for controlling each controlled device in a unified manner to exercise control.

Next, display device 900 as a control device includes communication unit 921, information acquiring unit 922, information classifying unit 923, menu generating unit 924, display unit 925, and page operation unit 926 as shown in FIG. 3.

Communication unit 921 communicates with controlled devices X1 through Xn connected to network 300. Controlled device X1 through Xn is one of first camera 400, second camera 500, intercom 600, air conditioner 700, or lighting device 800 in FIG. 1, for example. Information acquiring unit 922 acquires operation-related information from controlled devices X1 through Xn through communication unit 921. Here, controlled devices X1 through Xn connected to network 300 can be changed. In response to the connection conditions, information acquiring unit 922 determines connection conditions of controlled devices X1 through Xn connected to network 300 at given time intervals. Then, information acquiring unit 922 acquires the latest operation-related information including identifying information, operation information, and URL information corresponding to the operation information for each of controlled devices X1 through Xn connected to network 300, and updates operation-related information already acquired.

Information classifying unit 923 classifies URL information into plural function groups based on operation information contained in operation-related information on each controlled devices X1 through Xn, acquired by information acquiring unit 922. Here, when operation-related information is updated, information classifying unit 923 reclassifies operation-related information into plural function groups based on the operation-related information updated.

Menu generating unit 924 dynamically generates a menu page for each function group classified by information classifying unit 923. Here, when a function group is reclassified by information classifying unit 923, menu generating unit 924 dynamically generates a menu page according to the function group reclassified. Further details about generation of a menu page by menu generating unit 924 are described later.

Display unit 925 displays a menu page generated by menu generating unit 924.

Page operation unit 926 operates the menu page displayed on display unit 925 and a URL screen transmitted from processing unit 29.

Meanwhile, each of controlled devices X1 through Xn includes communication unit 27, operation-related information storing unit 28, and page processing unit 29.

Communication unit 27 communicates with display device 900 connected to network 300.

Figure 4:
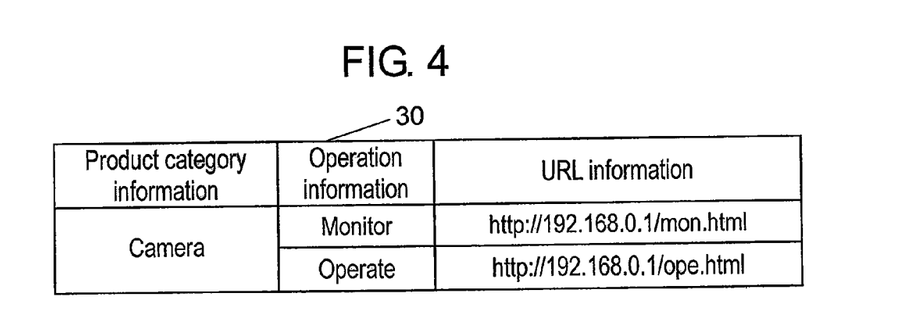
FIG. 4 shows configuration of operation-related information stored in a controlled device according to the embodiment.

Operation-related information storing unit 28 stores such as device identifying information and operation-related information. More specifically, operation-related information storing unit 28 stores such as device ID information, product category information, operation information, and definition information (e.g. URL information). FIG. 4 shows an example of information stored.

When page processing unit 29 receives a display request for an operation screen page based on URL information from display device 900, page processing unit 29 delivers an operation screen page (e.g. a page described in HTML (Hyper Text Markup Language)) specified by the URL information through communication unit 27. When controlled device X1 through Xn receives an operation instruction from display device 900, controlled device X1 through Xn executes its corresponding operation instruction.

Each of controlled devices X1 through Xn has its unique function and operation-related information corresponding to the unique function. For example, each of controlled devices X1 through Xn stores product category information, operation information, and operation-related information 30 containing URL information related to the operation information, as shown in FIG. 4.

Meanwhile, when controlled device X1 through Xn receives a request for operation-related information 30 from display device 900, controlled device X1 through Xn responds to display device 900 such as with device ID information and definition information (e.g. product category information) in addition to operation information and URL information related to the operation information, as operation-related information 30. In this responding, the extended area of UPnP specifications is used.

Figure 5:
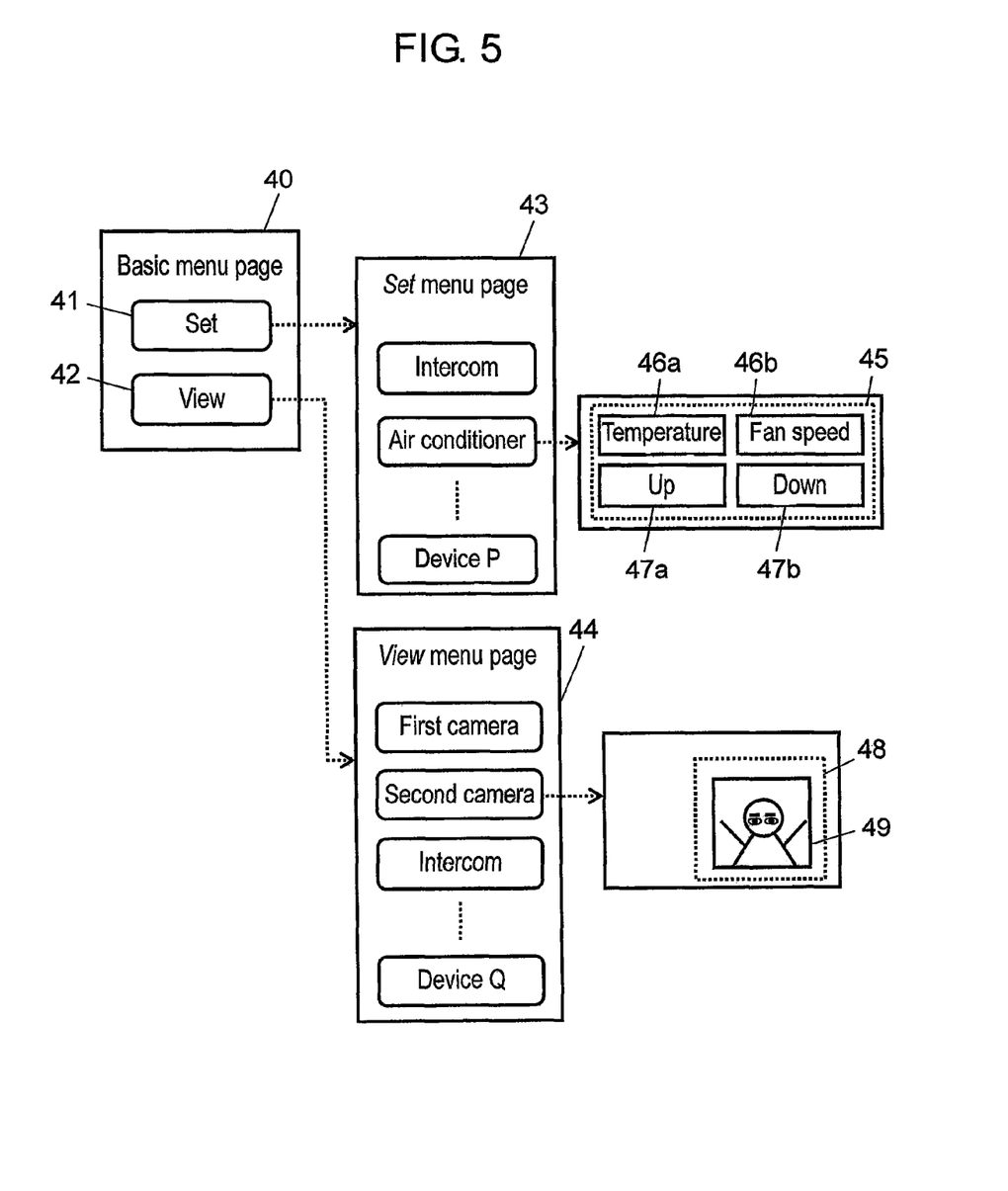
FIG. 5 is a transition diagram showing an example of menu generation in a display device according to the embodiment.

Next, a description is made of generation of a menu page by menu generating unit 924 using FIG. 5. FIG. 5 is a transition diagram showing an example of menu generation in display device 900 according to the first embodiment. Here, information classifying unit 923 extracts viewing function (monitor) and operation setting function (operate) from operation information contained in operation-related information 30. A description is made of a case where the URL information is classified into the viewing function group (related to viewing function) and the operation setting function group (related to operation setting function).

As shown in FIG. 5, menu generating unit 924 first generates basic menu page 40 for allowing a user to select a function group. The user views this basic menu page 40 to monitor only a device for a target function. As basic menu page 40, such as set menu 41 allowing a user to select operation setting function; and view menu 42 allowing a user to select viewing function are created according to the above-described function groups grouped by information classifying unit 923. The view menu 42 is an example of the above-described viewing function group related to viewing function; the set menu 41 is an example of the above-described operation setting function group related to operation setting function.

Next, menu generating unit 924 creates a list menu of devices having operation setting function out of controlled devices X1 through Xn connected to network 300, as set menu page 43 when set menu 41 is selected by the user. Similarly, menu generating unit 924 creates a list menu of devices having viewing function out of controlled devices X1 through Xn connected to network 300, as view menu page 44 when view menu 42 is selected by the user.

Intercom 600 has both viewing function (e.g. an image taken by the camera, sound in a conversation function) and operation setting function (e.g. adjusting the camera sensitivity, volume setting). Therefore information classifying unit 923 classifies intercom 600 into the viewing function group related to viewing function and the operation setting function group related to operation setting function. Menu generating unit 924 thus creates a menu from which intercom 600 can be selected both in set menu page 43 and view menu page 44.

Next, menu generating unit 924 generates an operation screen page for being displayed on a part of display unit 925, according to a function of controlled device X1 through Xn selected in set menu page 43 and view menu page 44. For example, when air conditioner menu is selected in set menu page 43 by the user, URL information correlated with air conditioner item is transmitted to communication unit 27 of air conditioner 700 through communication unit 921. Then, operation screen page 45 related to operation setting function is acquired from page processing unit 29 of air conditioner 700, and operation screen page 45 related to operation setting function is displayed on a part of display unit 925. Operation screen page 45 includes temperature menu 46a, fan speed menu 46b, up menu 47a, and down menu 47b to allow operation setting function to be operated. The user can operate up menu 47a and down menu 47b in conjunction with temperature menu 46a. Similarly, the user can operate up menu 47a and down menu 47b in conjunction with fan speed menu 46b. In this way, the user can operate setting of the temperature and setting of the fan speed of air conditioner 700 from page operation unit 926.

Similarly, when camera menu at the second from the top of view menu page 44 is selected by the user, for example, operation screen page 48 related to viewing function acquired from page processing unit 29 of second camera 500 is displayed on a part of display unit 925. Operation screen page 48 is provided with image display area 49 where an image from second camera 500 appears, allowing an image from second camera 500 to be displayed within the image display area.

In this way, information classifying unit 923 classifies URL information into the viewing function group related to viewing function; and the operation setting function group related to operation setting function, based on operation information contained in operation-related information 30. Then, menu generating unit 924 can dynamically generate set menu page 43 and view menu page 44, based on operation information for each function group. Then, set menu page 43 and view menu page 44 are displayed on display unit 925, allowing the user to operate the device from page operation unit 926. The user thus can directly operate a target function. More specifically, when the user desires to view an image taken by second camera 500 (i.e. controlled device), the user operates the operation screen of view menu page 44 in the function group related to viewing function to view the image. The apparatus thus places a light burden in operation on the user and reduces operation time, allowing the user to operate a controlled device easily and intuitively.

Figure 6:
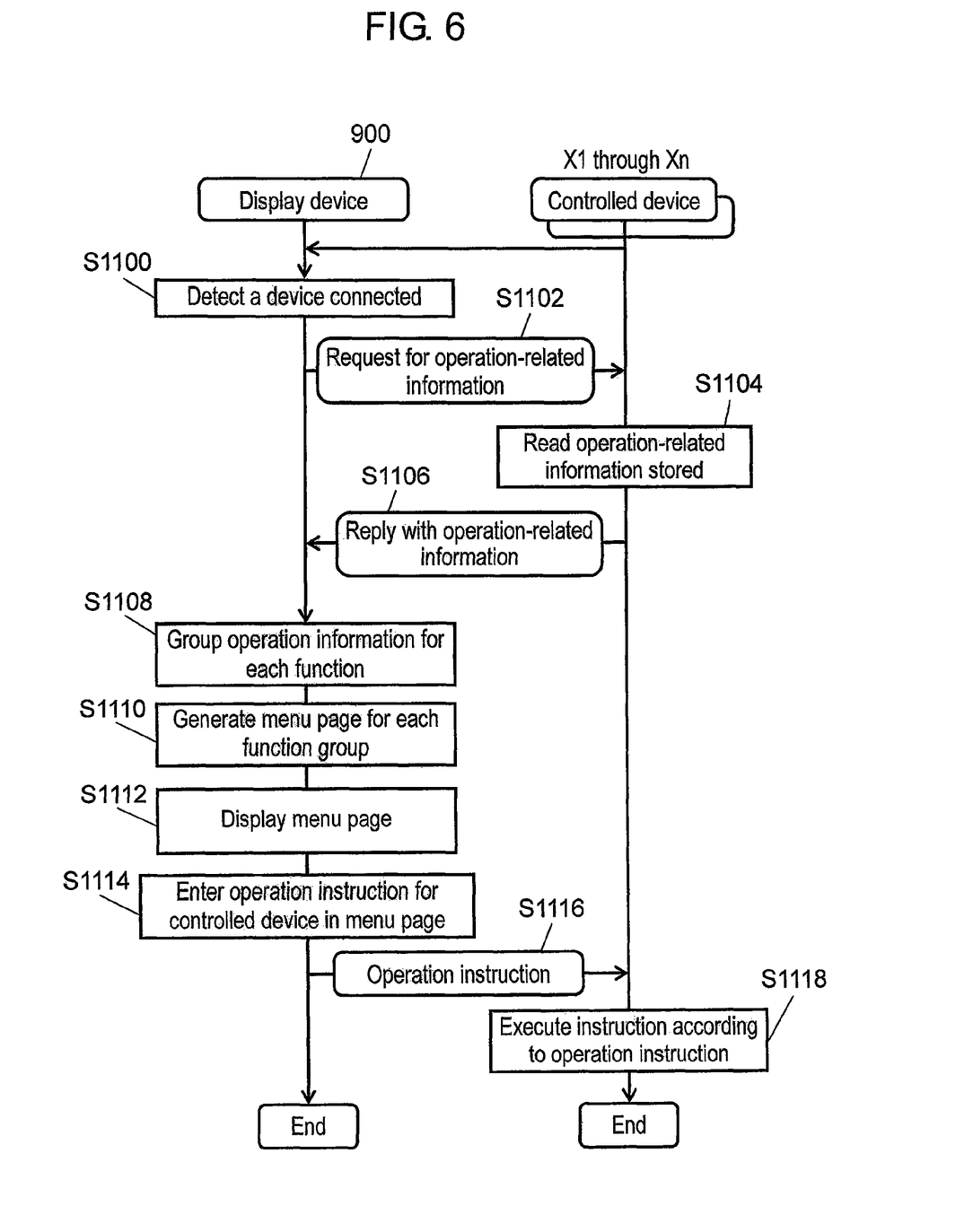
FIG. 6 is an explanatory drawing of a control sequence according to the embodiment.

Next, a description is made of a control sequence for controlled devices X1 through Xn by display device 900 (control device) using FIG. 6. FIG. 6 illustrates a control sequence in device control system 100 according to the first embodiment.

In FIG. 6, when display device 900 detects that a new controlled device has been connected to network 300 (S1100), display device 900 requests operation-related information from the controlled device (S1102). At this moment, the controlled device reads operation-related information from operation-related information storing unit 28 (S1104) and responds to display device 900 with operation-related information (S1106).

Here, S1100 through S1106 are executed each time a new controlled device is connected to network 300. More specifically, display device 900 determines connection conditions of controlled devices X1 through Xn in network 300 at given time intervals to acquire the latest operation-related information on controlled devices X1 through Xn connected network 300. When controlled device X1 through Xn connected to network 300 has been changed, display device 900 updates operation-related information acquired from each of controlled devices X1 through Xn according to the connection conditions.

Next, display device 900 groups operation information contained in the operation-related information by function (S1108). For example, display device 900 extracts viewing function (monitor) and operation setting function (operate) from operation-related information 30 in FIG. 2, and classifies them into the viewing function group related to viewing function; and the operation setting function group related to operation setting function. This classification process is performed such as every time operation-related information on controlled devices X1 through Xn is newly acquired, and when the power to display device 900 is turned on. Here, when acquisition information of the operation-related information has been updated by information acquiring unit 922, display device 900 reclassifies the operation information into plural function groups based on operation-related information acquired.

Next, menu generating unit 924 of display device 900 dynamically generates a menu page by function group (S1110). First, display device 900 creates set menu 41 allowing a user to select operation setting function; and view menu 42 allowing a user to select viewing function, as basic menu page 40. Here, menu generating unit 924 dynamically generates a menu page according to the reclassification of function groups. In this way, the user can monitor the latest connection conditions to identify only a device with a target function on the menu page.

Next, menu generating unit 924 creates a list menu of devices having operation setting function out of controlled devices X1 through Xn connected to network 300, as set menu page 43 when set menu 41 has been selected by the user. Meanwhile, menu generating unit 924 creates a list menu of devices having viewing function out of controlled devices X1 through Xn connected to network 300, as view menu page 44 when view menu 42 has been selected by the user.

Menu generating unit 924 further generates operation screen pages 45 and 48 for displaying on a part of display unit 925, according to a function of controlled device X1 through Xn selected in set menu page 43 and view menu page 44. If display device 900 is a TV, the user operates controlled device X1 through Xn while viewing a program, and thus the display preferably appears on a part of display unit 925.

Next, display device 900 displays either one of basic menu page 40, set menu page 43, view menu page 44, and operation screen pages 45 and 48, on a part of display unit 925 according to operation by the user (S1112).

The user enters operation instructions on the operation screen page for controlled device X1 through Xn according to a menu page displayed on display unit 925 from page operation unit 926 (S1114).

With this operation entry, display device 900 transmits the operation instruction to controlled device X1 through Xn (S1116). Controlled device X1 through Xn executes a function set according to the operation instruction (S1118).

As described hereinbefore, with device control system 100 according to the first exemplary embodiment of the present invention, display device 900 divides operation information into the viewing function group related to viewing function; and operation setting function group related to operation setting function, based on operation information of operation-related information 30. Then, display device 900 can dynamically generate set menu page 43 and view menu page 44 based on operation information for each function group, according to connection conditions of controlled device X1 through Xn connected to network 300. Display device 900 further displays set menu page 43 and view menu page 44 on display unit 925 and allows them to be operated from page operation unit 926. The user thus can select a function group to directly operate a target function. For example, when the user desires to view an image taken by second camera 500 (i.e. controlled device), the user operates view menu page 44 in the function group related to viewing function to allow an image taken by second camera 500 to be displayed directly on display unit 925. The apparatus thus places a light burden in operation on the user and reduces operation time, allowing the user to operate a controlled device easily. As a result, display device 900 can be provided allowing plural controlled devices X1 through Xn connected to network 300 to be operated easily.

Second Exemplary Embodiment

Figure 7:
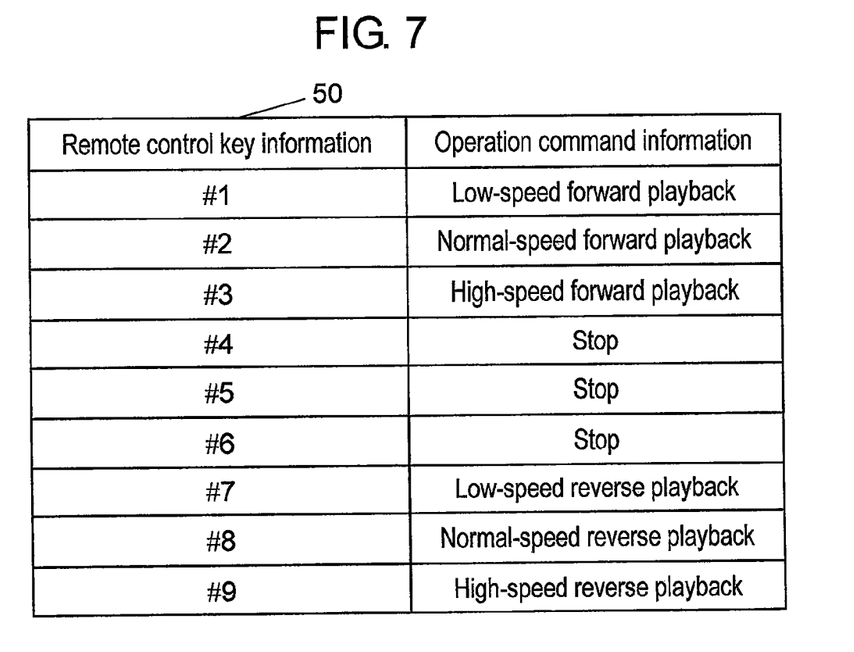
FIG. 7 shows configuration of operation-corresponding information for a controlled device according to the second exemplary embodiment of the present invention.
Figure 8:
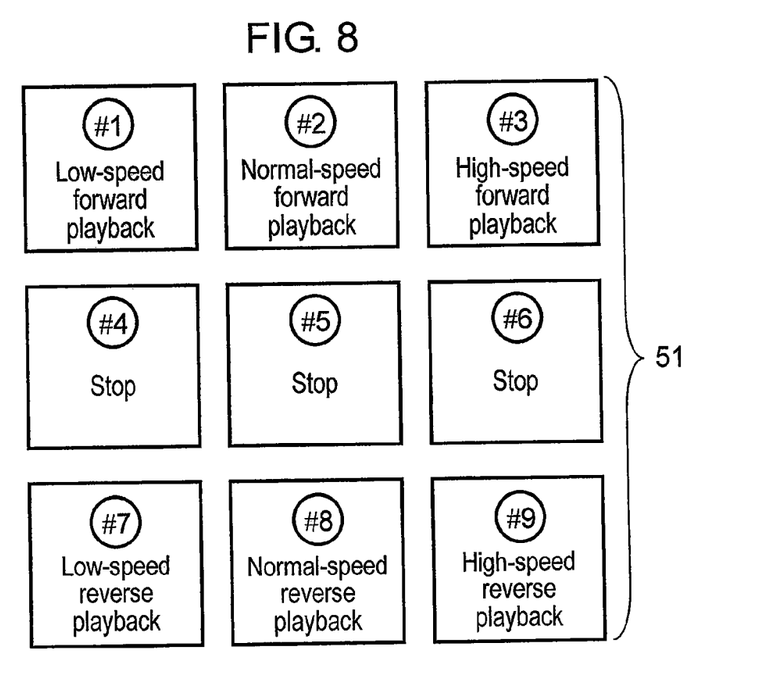
FIG. 8 is a relationship diagram showing correspondence between a menu arrangement and an operation command in a display device according to the embodiment.

Next, a description is made of another embodiment of display device 900 in device control system 100 according to the second exemplary embodiment of the present invention using FIG. 3 and FIGS. 7 through 10. FIGS. 1, 2, 4, 5, and 6 are the same as those in the second embodiment, and thus their descriptions are omitted. Here, the configuration of display device 900 and controlled devices is the same as that in device control system 100 in the first embodiment except that operation-related information storing unit 28 has a function further storing operation-corresponding information (described later). FIG. 7 shows configuration of operation-corresponding information for a controlled device according to the second embodiment. FIG. 8 is a relationship diagram showing correspondence between a menu arrangement and an operation command in display device 900 according to the second embodiment.

In the second embodiment of the present invention, operation-corresponding information 50 is transmitted that is produced by correlating key information of the remote control used for display device 900 with operation command information for each of controlled devices X1 through Xn, together with operation-related information, from controlled devices X1 through Xn.

As shown in FIG. 7, display device 900 acquires operation-corresponding information 50 describing relationship of correspondence between a remote control key number used by controlled device X1 through Xn and operation command information, from controlled device X1 through Xn. In operation-corresponding information 50 of FIG. 7, the first menu of the remote control key information is indicated as #1 in FIG. 7; the second menu, as #2; and the rest in the same way.

As shown in FIG. 8, display device 900 stores operation-corresponding information 50 in the storing unit (not shown). Display device 900 correlates a key number of the remote control used for display device 900 with a menu number in menu page 51, based on operation-corresponding information 50 stored. Display device 900 makes display unit 925 display a remote control screen corresponding to respective controlled devices X1 through Xn, based on a request from the user. Then, display device 900 controls respective controlled devices X1 through Xn by the user operating the remote control. Specifically, the first menu in menu page 51 is made correlate with low-speed forward playback (operation command), and this first menu is operated from the remote control to allow low-speed forward playback to be executed. In FIG. 8, the first menu is indicated as #1; the second menu, #2; and the rest in the same way. Similarly, display device 900 correlates the normal-speed forward playback with the second menu; high-speed forward playback to the third; stop to the fourth through sixth; low-speed reverse playback to the seventh; normal-speed reverse playback to the eighth; and high-speed reverse playback to the ninth. The user can operate respective remote control key numbers to control functions of a controlled device. To create a menu in menu page 51, screen information acquired from an external server or a controlled device may be used other than by being generated by menu generating unit 924. For example, a menu screen described in HTML, or a menu screen provided in GIF, JPEG, or bitmapped image format may be acquired from an external server to be used.

As described hereinbefore, with device control system 100 according to the second embodiment of the present invention, display device 900 correlates a menu number present in menu page 51 newly generated with a key number of the remote control used for display device 900. Accordingly, controlled devices X1 through Xn can be operated without requiring to know the code of the remote control key for controlled devices X1 through Xn. That is to say, display device 900 does not need to preliminarily store operation-corresponding information on all the controlled devices, thereby reducing the storage capacity. Further, devices inside device control system 100 can be increased flexibly. Also, the user can use a familiar remote control for display device 900, improving the convenience.

Menu generating unit 924 may dynamically generate a menu page based on given priority provided in operation information. For example, since display device 900 includes display unit 925, menu generating unit 924 generates a menu page so that a menu page for viewing function can be operated first, and during the generation process, menu generating unit 924 generates a menu page for operation setting function. A menu page thus can be dynamically generated according to the function of the control device, facilitating operation by the user to improve the operation efficiency.

Figure 9:
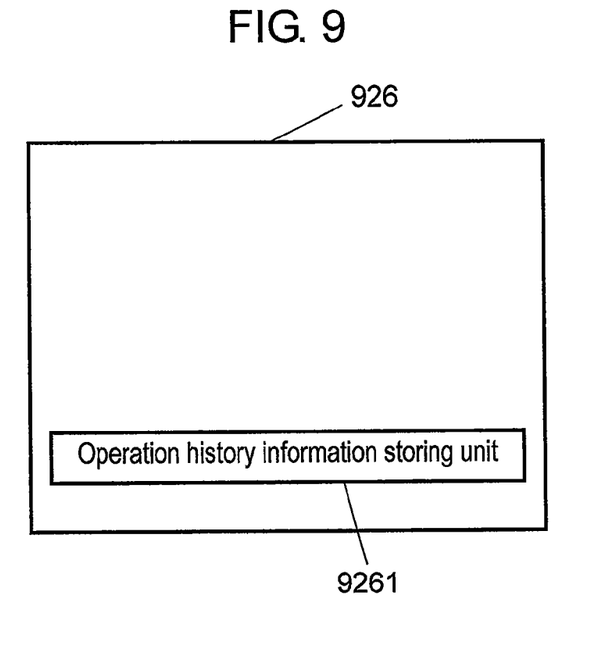
FIG. 9 is a block diagram showing configuration of the page operation unit of a display device according to another embodiment.

Further, as shown in FIG. 9, display device 900 can be equipped with operation history information storing unit 9261 storing URL selection information in the menu page operated from page operation unit 926 as operation history information. Menu generating unit 924 may give higher priority to URL information more frequently selected, based on this operation history information to dynamically generate a menu page where URL information appears in descending order of priority. Such arrangement allows a menu item (URL destination) frequently used by the user to be generated preferentially and to be displayed, thereby improving the operation efficiency and facilitating the operation.

Figure 10:
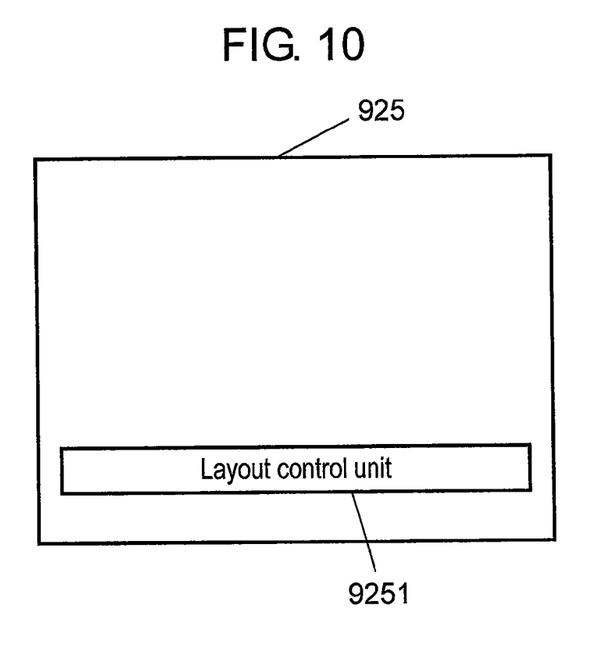
FIG. 10 is a block diagram showing configuration of the display unit of a display device according to yet another embodiment.

Further, when display device 900 is equipped with display unit 925 with a given display size, menu generating unit 924 controls the menu size, character size, and the number of menu lists according to the given display size. Then as shown in FIG. 10, layout control unit 9251 may be provided that dynamically changes the display aspect of a menu page generated by menu generating unit 924. Such arrangement allows a user-friendly menu page to be dynamically generated, thereby improving the user's operation efficiency and facilitating the operation.

Meanwhile, layout control unit 9251 may delete a menu item that is old or infrequently used according to the number of items displayed, based on the number of selection times and selection date and time stored in the operation history information storing unit. Layout control unit 9251 may change the display aspect of menu items according to the number of menu items displayed instead of deleting menu items. For example, others item may be newly generated to include a menu item infrequently selected in others item. Further, the display size of a menu page and the character size of a menu item may be changed according to the screen size of the display device. In this way, a menu page frequently operated by the user or highly likely to be operated can be dynamically generated, thereby providing a user-friendly menu page, improving the user's operation efficiency and facilitating the operation.

Here, display device 900 is a TV. However, equipment having display function may be equipped with a display device including communication unit 921, information acquiring unit 922, information classifying unit 923, menu generating unit 924, and page operation unit 926. For example, the display device is applicable such as to a mobile phone, remote control with display function, home information panel, and personal computer. In this case as well, menu display can be performed that improves the user's operation efficiency and facilitates the operation.

As is evident from the above description, according to the embodiment of the present invention, the information classifying unit can create plural function groups based on operation information of operation-related information, and the menu generating unit can generate a menu page for each of plural function groups classified. Then, the display unit displays the menu page while the user operates from the page operation unit. The user thus can operate a controlled device from a target function group. For example, when the user desires to view a camera image with a controlled device, the user can operate only a controlled device having viewing function by operating a menu page in the function group related to viewing function. The display device thus places a light burden in operation on the user and reduces operation time, allowing the user to operate a controlled device easily.

According to the embodiment of the present invention, operation information is classified into the viewing function group related to viewing function and into the operation setting function group related to operation setting function. Then, the menu generating unit can generate separate menu pages for the viewing function group related to viewing function and for the operation setting function group related to operation setting function, respectively. Accordingly, the user can operate a controlled device for a target function from a menu page simply by selecting the viewing function group and the operation setting function group, thereby reducing the operation time.

Further, according to the embodiment of the present invention, information acquired from a controlled device is effectively used, thereby improving the user's operation efficiency.

Further, according to the embodiment of the present invention, URL information based on given priority can be stored and displayed preferentially. For example, the display device, equipped with a display unit, can store URL information related to viewing function preferentially if the URL destination has two functions described therein, thereby allowing the display device to generate a menu page in the order of closeness to functions possessed by the display device. This improves the operation efficiency when the user operates.

Furthermore, according to the embodiment, the display size of a menu page and the character size of a menu item can be changed according to the screen size of the display device, thereby providing a user-friendly menu page.

Further, according to the embodiment, a remote controller screen based on operation-corresponding information can be operated, and a controlled device can be operated by operating the remote controller screen without requiring to know key information for the controlled device.

As described hereinbefore, the present invention provides a display device allowing plural controlled devices connected to a network to be easily operated.

INDUSTRIAL APPLICABILITY

According to the present invention, a menu page can be dynamically generated and operated that has been grouped based on functions described in operation-related information on each controlled device connected to a network. Herewith, the present invention places a light burden in operation on the user and reduces operation time, allowing the user to operate a controlled device easily, and thus is useful such as for a display device and device control system.

The invention claimed is:

1. A display device network-connected to a plurality of controlled devices, comprising:
   an information acquiring unit acquiring operation-related information from the plurality of controlled devices, the operation-related information containing operation information for at least one operation function and uniform resource location (URL) information corresponding to the operation information;
   an information classifying unit classifying the URL information into a plurality of function groups based on the operation information, the plurality of function groups including a first function group related to viewing functions of at least one of the plurality of controlled devices and a second function group related to operation setting functions of at least one of the plurality of controlled devices;
   wherein the viewing function of the at least one controlled device enables a user to view an image generated by the controlled device, and wherein the operation setting function of the at least one controlled device enables the user to change a setting of the controlled device;
   a menu generating unit generating a menu page for each of the function groups, wherein one of the function groups of the plurality of controlled devices is selected prior to selection of the controlled device;
   a display unit displaying each menu page; and
   a page operation unit accessing the corresponding URL information by operating the respective menu page.

2. The display device of claim 1,
   wherein the operation information has priority, and
   wherein the menu generating unit generates the menu page based on the priority.

3. The display device of claim 2, further comprising:
   an operation history information storing unit storing the URL information accessed by the page operation unit as operation history information,
   wherein the menu generating unit generates the menu page based on the operation history information stored in the operation history information storing unit based on the priority.

4. The display device of claim 3, further comprising:
   a layout control unit changing a display aspect of a menu item in the menu page based on the operation history information.

5. The display device of claim 1,
   wherein the information acquiring unit further acquires operation-corresponding information created by correlating key information for a remote controller of the controlled device with operation command information, and wherein the display unit displays a remote controller screen generated by the menu generating unit based on the operation-corresponding information, and the controlled device is operated by using operation command information corresponding to a key in the remote controller screen.

6. A display method for a display device connected to a plurality of controlled devices via a network, the display method comprising:

acquiring operation-related information from the plurality of controlled devices, the operation-related information containing operation information for at least one operation function and uniform resource location (URL) information corresponding to the operation information;

classifying the URL information into a plurality of function groups based on the operation information, the plurality of function groups including a first function group related to viewing functions of at least one of the plurality of controlled devices and a second function group related to operation setting functions of at least one of the plurality of controlled devices;

wherein the viewing function of the at least one controlled device enables a user to view an image generated by the controlled device, and wherein the operation setting function of the at least one controlled device enables the user to change a setting of the controlled device;

generating a menu page for each of the function groups, wherein one of the function groups of the plurality of controlled devices is selected prior to selection of the controlled device;

displaying each menu page; and accessing the corresponding URL information by operating the respective menu page.

* * * * *